United States Patent
Simmons

(10) Patent No.: US 7,908,516 B2
(45) Date of Patent: Mar. 15, 2011

(54) LOW POWER MODE FAULT RECOVERY METHOD, SYSTEM AND APPARATUS

(75) Inventor: Michael Simmons, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 508 days.

(21) Appl. No.: 12/017,521

(22) Filed: Jan. 22, 2008

(65) Prior Publication Data

US 2008/0238472 A1  Oct. 2, 2008

Related U.S. Application Data

(60) Provisional application No. 60/908,328, filed on Mar. 27, 2007.

(51) Int. Cl.
  *G06F 11/00* (2006.01)
(52) U.S. Cl. .............................................. 714/22; 714/21
(58) Field of Classification Search .................... 714/21, 714/22
  See application file for complete search history.

(56) References Cited

U.S. PATENT DOCUMENTS

| | | | | |
|---|---|---|---|---|
| 5,764,653 A * | 6/1998 | Wuidart | ...................... | 714/718 |
| 5,889,981 A * | 3/1999 | Betker et al. | .................. | 712/227 |
| 6,016,555 A * | 1/2000 | Deao et al. | ...................... | 714/35 |
| 6,035,422 A * | 3/2000 | Hohl et al. | ...................... | 714/35 |
| 6,356,960 B1 * | 3/2002 | Jones et al. | ........................ | 710/5 |
| 6,389,557 B1 * | 5/2002 | Yu et al. | ............................ | 714/34 |
| 6,510,528 B1 * | 1/2003 | Freeman et al. | .................. | 714/6 |
| 6,694,451 B2 * | 2/2004 | Atkinson | ........................ | 714/15 |
| 6,862,694 B1 * | 3/2005 | Tormey et al. | .................. | 714/34 |
| 7,161,866 B2 * | 1/2007 | Harrington et al. | ........... | 365/227 |
| 7,213,172 B2 * | 5/2007 | Iovin et al. | ...................... | 714/36 |
| 7,249,285 B2 * | 7/2007 | Brock et al. | ...................... | 714/34 |
| 7,334,161 B2 * | 2/2008 | Williams et al. | ................ | 714/34 |
| 7,596,737 B2 * | 9/2009 | Wang et al. | .................... | 714/733 |
| 2004/0088630 A1 * | 5/2004 | Arima et al. | .................. | 714/744 |
| 2005/0188186 A1 * | 8/2005 | Wolczko et al. | .............. | 712/227 |
| 2007/0250755 A1 * | 10/2007 | Burleson et al. | .............. | 714/763 |

FOREIGN PATENT DOCUMENTS

GB  PCT/GB2004/001143 A1  9/2004

OTHER PUBLICATIONS

International Search Report and Written Opinion for PCT/US2008/058196 mailed Aug. 29, 2008.

* cited by examiner

*Primary Examiner* — Joshua A Lohn
(74) *Attorney, Agent, or Firm* — King & Spalding L.L.P.

(57) ABSTRACT

A semiconductor integrated circuit device uses two keeper cells per configuration and/or enable bit as dual redundant storage with error detection thereof. One of the two keeper cells stores a logic level and the other keeper cell stores the inverse of that logic level before the integrated circuit device goes into a low power mode. An exclusive OR (XOR) is performed on the outputs of the two keeper cells (a keeper cell pair) such that if the two keeper cells of the keeper cell pair do not have opposite logic levels stored therein, then the respective XOR outputs an error signal for that keeper cell pair and the error signal is used to force the integrated circuit device out of the low power mode, depending on software control, with or without disturbing input-output (I/O) configuration control and data states present at the time the low power mode was entered.

17 Claims, 4 Drawing Sheets

LOW POWER MODE FAULT RECOVERY METHOD, SYSTEM AND APPARATUS

RELATED PATENT APPLICATION

This application claims priority to commonly owned U.S. Provisional Patent Application Ser. No. 60/908,328; filed Mar. 27, 2007; entitled "Low Power Mode Fault Recovery Method, System and Apparatus," by Michael Simmons; and is related to commonly owned U.S. patent application Ser. No. 11/609,610; filed Dec. 12, 2006; entitled "Maintaining Input and/or Output Configuration and Data State During and When Coming Out of a Low Power Mode," by Michael Simmons and Igor Wojewoda; both are hereby incorporated by reference herein for all purposes.

TECHNICAL FIELD

The present disclosure relates to a semiconductor integrated circuit device when coming out of a power saving mode, e.g., a deep sleep mode, and more particularly, for providing fault detection of critical enable and/or configuration signals and a subsequent failsafe recovery from the power saving "deep sleep" mode when the fault is detected.

BACKGROUND

Integrated circuit devices are being fabricated with decreasing transistor geometry sizes that result in increased leakage currents during operation thereof. One solution to reducing leakage currents when operation of the integrated circuit device is not required is to shut down and/or remove power from some or most of the transistor logic circuits of the integrated circuit device. This puts most of the transistor logic circuits of the integrated circuit device into a "low power consumption mode," e.g., a "deep sleep mode," that substantially reduces the power consumption of the integrated circuit device during extended standby conditions that may be defined through software and/or firmware.

For example, the low power consumption (deep sleep) mode may shut down a majority of the circuits in the integrated circuit device while still maintaining logic level values at both internal and external connectivity points of the integrated circuit device, e.g., through keeper cells. The keeper cells may be used to retain, e.g., "keep," the logic levels of the external input-output (I/O), internal status, configuration, and/or enable signals that were present just before the integrated circuit device went into the deep sleep mode. Due to the nature of what the deep sleep mode does to the circuits of the integrated circuit device, entry into and exit from the deep sleep mode must be as robust as possible.

Therefore, it is very likely that a hardware fault in the configuration inputs for the deep sleep mode may cause the integrated circuit device to enter into a state from which it may never be able to wake up. This inability to wake up would effectively lock-up (hang-up) the integrated circuit device so that it could never recover from and come out of the deep sleep mode. Robustness of an exit from the deep sleep mode may be accomplished through the use of a deep sleep watchdog timer (DSWDT) and the like. However, what insures the robustness of the DSWDT or other exit function so that the integrated circuit device is not trapped in a deep sleep mode that is non-recoverable?

SUMMARY

Therefore there is a need to prevent the integrated circuit device from being trapped in a deep sleep mode that is non-recoverable. According to the teachings of this disclosure, once a fault is detected, the integrated circuit device may perform a guaranteed exit from a deep sleep mode in a predefined, fixed sequence and predetermined amount of time. This may provide a software option for recovering from a circuit fault substantially all of the time.

Generally, the enable and configuration inputs of the DSWDT or other deep sleep exit function circuits may be driven from keeper cells that always retain power (active logic levels) whether the integrated circuit device is in or out of the deep sleep mode. However, what guarantees that these keeper cells are not themselves corrupted? For example, soft errors can occur due to transistor cell corruption and/or transients (noise) that may alter the logic level stored in one or more keeper cells.

According to the teachings of this disclosure, two keeper cells may be used as dual redundant storage with error detection thereof. One of the two keeper cells stores a logic level and the other keeper cell stores the inverse of that logic level before the integrated circuit device goes into the deep sleep mode. An exclusive OR (XOR) is performed on the outputs of the two keeper cells (a keeper cell pair) such that if the two keeper cells of the keeper cell pair do not have opposite logic levels stored therein, then the respective XOR outputs an error for that keeper cell pair.

Thus, enable and configuration data that is critical to the proper operation of going into and/or coming out of a deep sleep mode may be stored in an appropriate number of keeper cell pairs, each of the keeper cell pairs having an error detection function, e.g., XOR the non-inverted and inverted stored logic levels from the respective ones of the keeper cell pairs containing the enable and configuration data for the deep sleep recovery circuit(s), e.g., DSWDT. But generation of an enable and/or configuration error should not cause a total reset of the integrated circuit device which could disturb the existing input-output logic levels and other data levels throughout the integrated circuit device, e.g., logic levels stored in other keeper cells such as those used for maintaining external input-output logic levels.

Thus, detection of an error in any one or more of the keeper cell pairs will force the DSWDT or other deep sleep exit function circuit to assume a pre-established wake-up configuration that will cause the integrated circuit device to come out of the deep sleep mode. Once out of the deep sleep mode, the integrated circuit device may be able to correct for or recover from a soft error associated with the DSWDT or other deep sleep exit function circuit. This pre-established wake-up configuration may be stored in volatile, e.g., a wake-up program stored in a memory that is not in the deep sleep mode and/or nonvolatile memory, e.g., fuse links, metallization, electrically erasable and programmable memory (EEPROM), Flash memory and the like. Similarly, the logic levels stored in the keeper cell pairs may come from volatile and/or nonvolatile memory, including manufacturer and/or user defined wakeup program protocols. Deep sleep mode and low power mode may be used interchangeably herein to mean any mode that an integrated circuit device may enter that reduces power consumption thereof.

According to a specific example embodiment as described in the present disclosure, an integrated circuit device having a low power mode comprises: power controllable logic; power control for the power controllable logic, wherein the power control causes the power controllable logic to go into and return from a low power mode; at least one keeper cell pair coupled between the power controllable logic and the power control, wherein the at least one keeper cell pair has error detection; and the at least one keeper cell pair stores configuration information for the power control when the power controllable logic is in the low power mode; wherein if an error is detected for the configuration information stored in the at least one keeper cell pair then the power control returns the power controllable logic from the low power mode.

According to another specific example embodiment as described in the present disclosure, a method for insuring recovery from a low power mode of an integrated circuit device comprises the steps of: entering a low power mode; storing configuration information for controlling a low power mode of an integrated circuit device in at least one keeper cell pair; detecting when the stored configuration information in the at least one keeper cell pair is corrupted; and forcing recovery of the integrated circuit device from the low power mode upon detection of corrupted stored configuration information in the at least one keeper cell pair.

BRIEF DESCRIPTION OF THE DRAWINGS

A more complete understanding of the present disclosure thereof may be acquired by referring to the following description taken in conjunction with the accompanying drawing, wherein.

Figure 1:
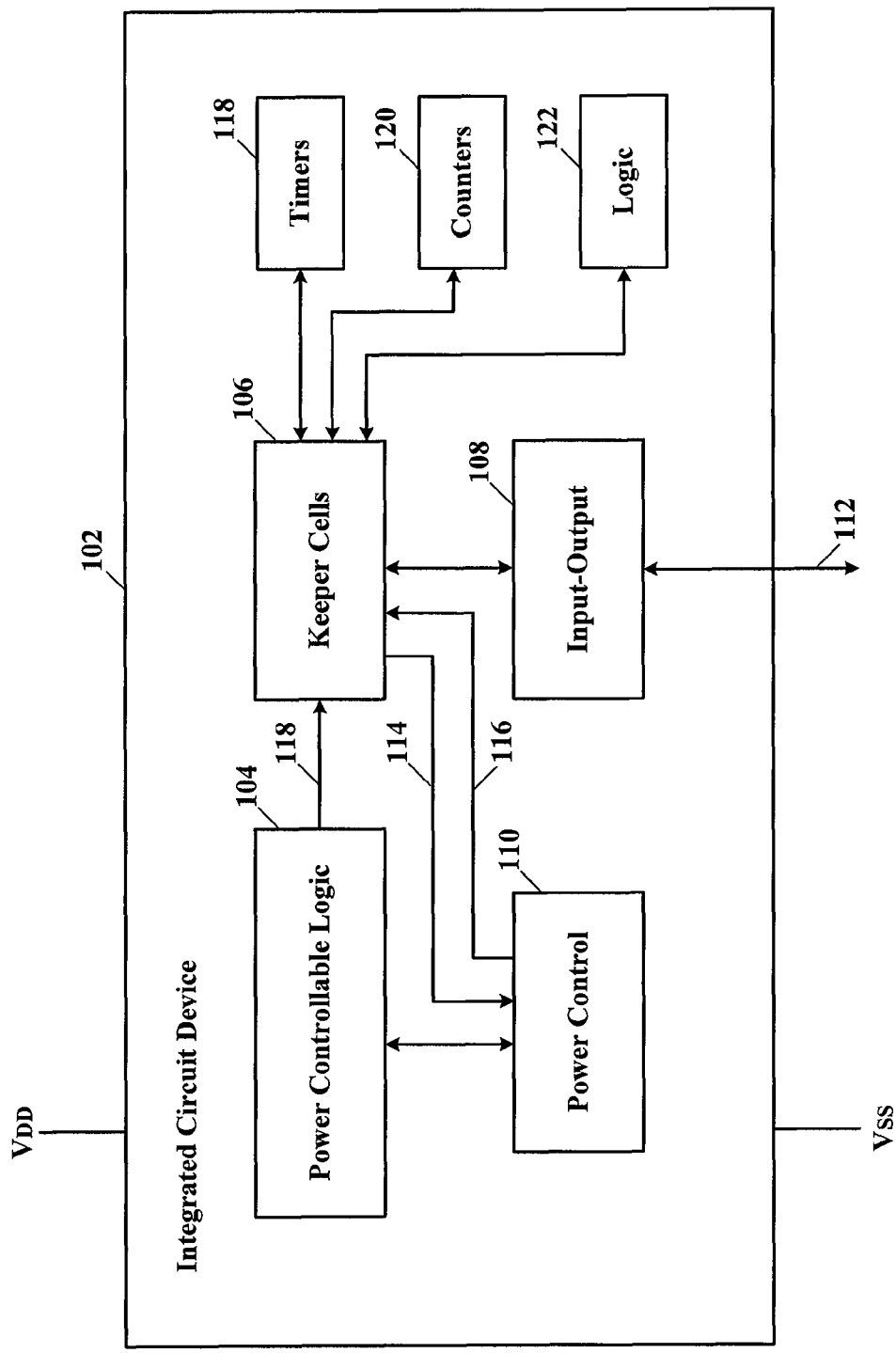
FIG. 1 illustrates a schematic block diagram of an integrated circuit device having power controllable logic, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of an integrated circuit device having power controllable logic, according to a specific example embodiment of this disclosure. An integrated circuit device 102 comprises power controllable logic 104, keeper cells 106, input receivers and output drivers 108, and power control 110. In addition, timers 118, e.g., watch dog timer, deep sleep watch dog timer, etc.; counters 120; and/or logic 122, e.g., registers, combinatorial logic, latches, etc.; may be coupled to associated ones of the keeper cells 106.

The integrated circuit device 102 may function as a digital and/or analog (mixed signal) device wherein power consuming circuits thereof (e.g., power controllable logic 104) may be shutdown (e.g., put into a deep sleep and/or low power mode) when not in use so as to conserve power supplied from a power source, e.g., battery, solar cell, on-chip voltage regulator, etc. The power controllable logic 104 may be disconnected from the power source while the keeper cells 106, power control 110, the input-output 108, the timers 118, the counters 120, and/or logic 122 remain connected to the power source all of the time.

The power control 110 may be programmed in various ways so as to perform a power shutdown, e.g., deep sleep mode and/or low power mode, of the power controllable logic 104, then upon certain events reapply power to the power controllable logic 104, e.g., wake-up from a deep sleep and/or low power mode. The power control 110 and/or timers 118 may include a deep sleep watchdog timer (DSWDT) and the like, where some of the keeper cells 106 may hold configuration and enable information (e.g., data bits, one bit per keeper cell) for operation of the power control 110. The configuration and enable information may be supplied to the respective keeper cells 106 from the power controllable logic 104 while in an operational mode, wherein the respective keeper cells 106 retain this information when power is removed from the power controllable logic 104 and the device 102 is in the deep sleep mode. The configuration and enable information may be user and/or manufacturer defined.

Figure 2:
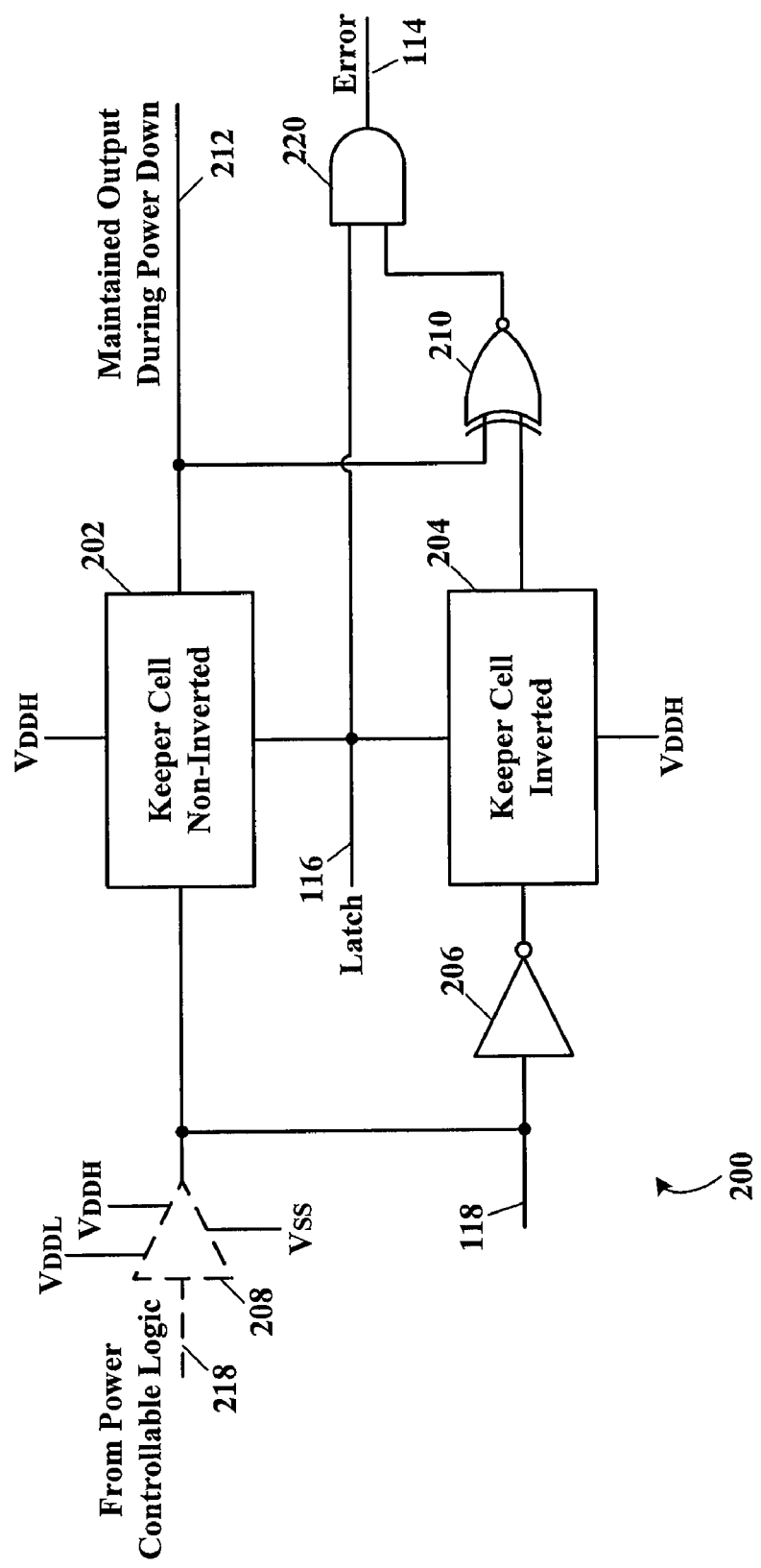
FIG. 2 illustrates a schematic diagram of a keeper cell pair having error detection, according to a specific example embodiment of this disclosure.

Referring to FIG. 2, depicted is a schematic diagram of a keeper cell pair having error detection, according to a specific example embodiment of this disclosure. The keeper cell pair having error detection, generally represented by the numeral 200, comprises a first keeper cell 202, a second keeper cell 204, an inverter 206, an NXOR gate 210, and an AND gate 220. The keeper cell pair 200 has an input 118 coupled to a respective logic output (FIG. 1) from the power controllable logic 104. Voltage $V_{DDL}$ is removed when the integrated circuit device 102 is in a low power and/or deep sleep mode, while $V_{DDH}$ remains on at all times so as to maintain the keeper cells 106 (FIG. 1) functional throughout the low power and/or deep sleep periods.

Optionally, a buffer 208, e.g., level translator, may be used between the power controllable logic 104 and the keeper cell pair 200 when the $V_{DDL}$ voltage is not the same as the $V_{DDH}$ voltage. The buffer 208 has an input 218 coupled to a respective logic output (not shown) from the power controllable logic 104. Voltage $V_{DDL}$ is removed when the integrated circuit device 102 is in a low power deep sleep mode, while $V_{DDH}$ remains on at all times so as to maintain the keeper cells 106 functional throughout deep sleep periods.

The first keeper cell 202 stores a non-inverted logic level from the power controllable logic 104 and the second keeper cell 204 stores an inverted logic level from the power controllable logic 104 (through the inverter 206). Now the first and second keeper cells 202 and 204, respectively, form a keeper cell pair that stores both the non-inverted and inverted logic levels from the power controllable logic 104. The outputs of the first and second keeper cells 202 and 204 are monitored by the NXOR gate 210. Normally, the outputs of the first and second keeper cells 202 and 204 will of opposite logic levels and the output of the NXOR gate 210 will be at a logic "0." However, if one of the first or second keeper cells 202 or 204 becomes corrupted, then the logic levels at the inputs to the NXOR gate 210 will become the same and the output of the NXOR gate 210 will be at a logic "1."

It is contemplated and within the scope of this disclosure that the first and second keeper cells 202 and 204 may store the same logic level and the Q-output (not shown) of the first keeper cell 202 and the Q-not-output (not shown) of the second keeper cell 202 may be used as inputs to the NXOR gate 210 instead. When a logic "1" is asserted on the latch line 116, the first and second keeper cells 202 and 204 will store the non-inverted and inverted logic levels, respectively, as described above and the AND gate 220 will be enabled such that if the output of the NXOR gate 210 goes to a logic "1" (e.g., corruption of the contents of one of the keeper cells 202 or 204) then a logic "1" will be asserted on the error line 114. The error line 114 may then be used to force the power control 110 to bring the power controllable logic 104 out of the low power mode and/or deep sleep mode (FIG. 1).

Figure 3:
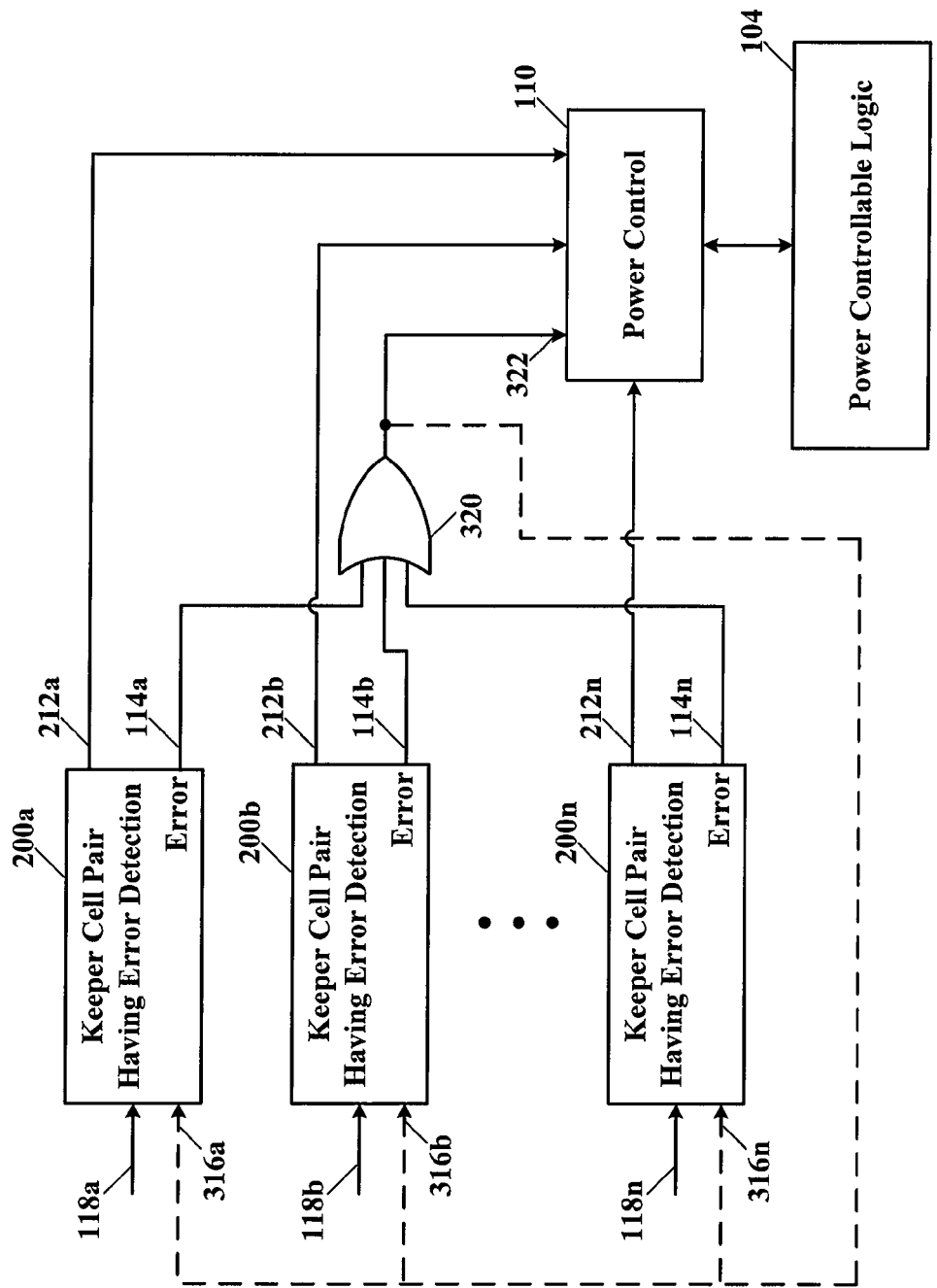
FIG. 3 illustrates a more detailed schematic block diagram of a portion of the integrated circuit device depicted in FIG. 1, according to a specific example embodiment of this disclosure.

Referring to FIG. 3, depicted is a more detailed schematic block diagram of a portion of the integrated circuit device depicted in FIG. 1, according to a specific example embodiment of this disclosure. A plurality of keeper cell pairs 200 may be used as described hereinabove for storing configuration and enable information, e.g., outputs 212, for the power control 110. However, if an error is indicated on any one or more of the error lines 114, then some action must be taken short of causing the integrated circuit device 102 to go into a total reset which may corrupt critical logic levels at which the external outputs and/or inputs of the device 102 must remain, and/or internal data storage values (not shown).

According to the teachings of this disclosure, when one or more of the configuration and/or enable bits controlling the power control 110 become corrupted as indicated by an error signal on one or more of the error lines 114, a forced exit from the deep sleep mode may be initiated by the OR gate 320 having a logic "1" output on the signal line 322. Whenever there is a logic "1" on the signal line 322, the power control may force or switch to a predefined exit strategy from the deep sleep mode so that the power controllable logic 104 may be reactivated and a software program running therein, or external intervention, may in some fashion deal with whatever caused the error indication on the error line 114. The predefined deep sleep exit strategy, e.g., fixed configuration and/or enable information, may be stored in the power control 110 and/or in the keeper cell pairs 200 (control indicated by the dashed lines). This predefined deep sleep exit strategy is similar to a "normal" exit strategy, except that an "error" status is flagged. Software control then has the option of keeping or releasing the input-output signals, as more fully defined in commonly owned U.S. patent application Ser. No. 11/609,610; filed Dec. 12, 2006; entitled "Maintaining Input and/or Output Configuration and Data State During and When Coming Out of a Low Power Mode," by Michael Simmons and Igor Wojewoda.

Figure 4:
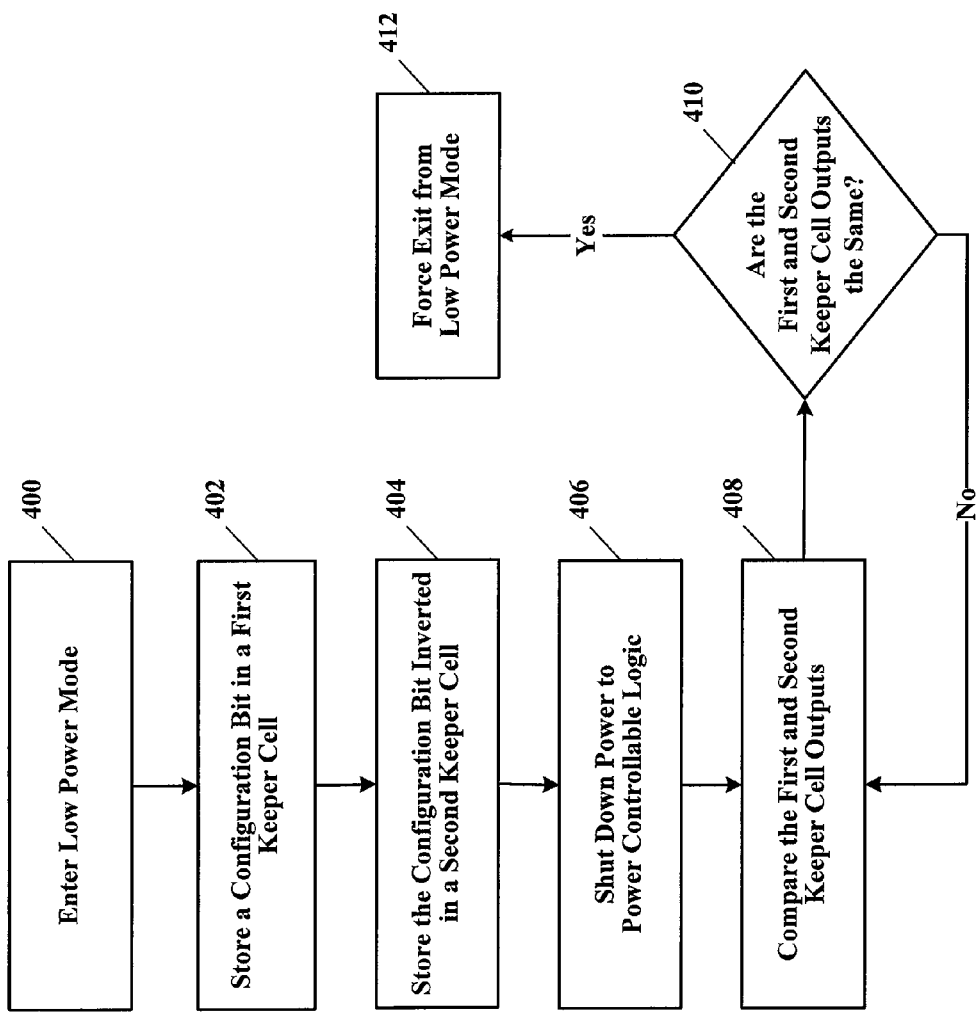
FIG. 4 illustrates a schematic operational flow diagram for a low power mode control sequence having forced power restore when an error is detected in a keeper cell pair associated with power control of the integrated circuit device shown in FIG. 1, according to a specific example embodiment of this disclosure.

Referring to FIG. 4, depicted is a schematic operational flow diagram for a low power mode control sequence having forced power restore when an error is detected in a keeper cell pair associated with power control of the integrated circuit device shown in FIG. 1, according to a specific example embodiment of this disclosure. A low power mode is entered in step 400, then in step 402, a configuration (or enable) bit is stored in a first keeper cell. In step 404, the configuration (or enable) bit is inverted and stored in a second keeper cell. Then in step 406, the integrated circuit device shuts down power to the power controllable logic. In step 408 the first and second keeper cell outputs are compared. Then step 410 determines if these outputs are at the same logic level (e.g., soft error of one cell). If the outputs are the same, then step 412 forces an exit from the low power (deep sleep) mode.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An integrated circuit device having a low power mode, comprising:
    power controllable circuits;
    power control for the power controllable circuits, wherein the power control causes the power controllable circuits to go into and return from a low power mode;
    at least one keeper cell pair coupled between the power controllable logic and the power control, wherein the at least one keeper cell pair has continuous error detection; and
    the at least one keeper cell pair stores one bit of configuration information for the power control for each one of the at least one keeper cell pair when the power controllable circuits are in the low power mode;
    wherein if an error is detected for the configuration information stored in the at least one keeper cell pair an error signal is generated that forces the power control to return the power controllable circuits from the low power mode to a predefined error exit mode for handling the detected error.

2. The integrated circuit device according to claim 1, wherein the at least one keeper cell pair having error detection comprises:
    a first keeper cell that stores a non-inverted configuration information bit;
    a second keeper cell that stores an inverted configuration information bit; and
    a comparison circuit for determining whether the first and second keeper cells have outputs at substantially the same logic level, wherein the error signal is generated if the first and second keeper cell outputs are at substantially the same logic level.

3. The integrated circuit device according to claim 1, wherein the the predefined error exit mode comprises predefined forced configuration information for the power control.

4. The integrated circuit device according to claim 1, wherein the at least one keeper cell pair are a plurality of keeper cell pairs storing an enable and the configuration information for the power control when the power controllable logic is in the low power mode.

5. The integrated circuit device according to claim 3, wherein the power control stores the predefined forced configuration information that is used to configure operation of the power control when the error is detected.

6. The integrated circuit device according to claim 5, wherein the predefined forced configuration information is stored in a non-volatile memory.

7. The integrated circuit device according to claim 1, wherein the low power mode is a deep sleep mode.

8. The integrated circuit device according to claim 7, wherein the power control is a deep sleep watchdog timer.

9. The integrated circuit device according to claim 1, wherein the power controllable circuits comprise both digital logic and analog circuits.

10. The integrated circuit device according to claim 1, further comprising at least one timer coupled to the at least one keeper cell pair.

11. The integrated circuit device according to claim 1, further comprising at least one counter coupled to the at least one keeper cell pair.

12. The integrated circuit device according to claim 1, further comprising logic coupled to the at least one keeper cell pair.

13. A method for insuring recovery from a low power mode of an integrated circuit device, said method comprising the steps of:
- entering a low power mode;
- storing configuration information for controlling a low power mode of power controllable circuits an integrated circuit device in at least on keeper cell pair;
- continuously detecting when the stored configuration information in the at least one keeper cell pair is corrupted; and
- forcing recovery of the power controllable circuits of the integrated circuit device from the low power mode to a predefined error exit mode upon detection of corrupted stored configuration information in the at least one keeper cell pair.

14. The method according to claim 13, wherein the step of storing configuration information comprises the steps of:
- storing non-inverted configuration information in a one of the at least one keeper cell pair; and
- storing inverted configuration information in an other one of the at least one keeper cell pair.

15. The method according to claim 13, wherein the step of detecting when the stored configuration information is corrupted comprises the steps of:
- comparing the storing non-inverted configuration information with the inverted configuration information;
- generating an error signal if any respective ones of the non-inverted configuration information and the inverted configuration information are at substantially the same logic level.

16. The method according to claim 13, wherein the step of forcing recovery of the power controllable circuits of the integrated circuit device from the low power mode upon detection of corrupted stored configuration information comprises the steps of:
- forcing use of recovery configuration information; and
- returning the power controllable circuits of the integrated circuit device from the low power mode by using the forced recovery information.

17. The integrated circuit device according to claim 13, wherein the low power mode is a deep sleep mode.

\* \* \* \* \*